(12) United States Patent
Ceroll et al.

(10) Patent No.: US 6,595,096 B2
(45) Date of Patent: *Jul. 22, 2003

(54) BLADE AND MOTOR CARRIER WITH HEIGHT/ANGLE ADJUSTMENT MECHANISM

(75) Inventors: Warren A. Ceroll, Owings Mills, MD (US); Frederick R. Bean, Finksburg, MD (US); Maria I. Kenyon, Taneytown, MD (US); James R. Parks, Timonium, MD (US); Robert S. Gehret, Hampstead, MD (US); David A. Porter, Hanover, PA (US); Michael L. O'Banion, Westminster, MD (US); Daniel Puzio, Baltimore, MD (US); Kevin D. Brewer, Mount Joy, PA (US)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/947,992

(22) Filed: Sep. 6, 2001

(65) Prior Publication Data

US 2002/0005103 A1 Jan. 17, 2002

Related U.S. Application Data

(62) Division of application No. 09/416,425, filed on Oct. 12, 1999, now Pat. No. 6,453,786, which is a division of application No. 09/179,815, filed on Oct. 27, 1998, now Pat. No. 6,244,149, which is a division of application No. 08/663,538, filed on Jun. 17, 1996, now Pat. No. 5,875,698.

(51) Int. Cl.⁷ .............................. B27B 5/24; B27B 5/32
(52) U.S. Cl. ...................... 83/473; 83/477.1; 83/477.2; 83/481; 83/491; 144/286.5
(58) Field of Search ................................ 83/471.3, 472, 83/473, 477, 477.1, 477.2, 481, 490, 491, 581, 666, 859; 144/286.1, 286.5; 74/32

(56) References Cited

U.S. PATENT DOCUMENTS

| 366,633 A | 7/1887 | Mackintosh |
| 963,697 A | 7/1910 | Dyer |
| 1,262,185 A | 4/1918 | Drew |
| 1,314,291 A | 8/1919 | Wallace |
| 1,455,426 A | 5/1923 | Charles |
| 1,523,174 A | 1/1925 | Comeau |
| 1,593,317 A | 7/1926 | Thomes |

(List continued on next page.)

Primary Examiner—Clark F. Dexter
(74) Attorney, Agent, or Firm—Harness, Dickey & Pierce, P.L.C.

(57) ABSTRACT

A machine tool has a work table which defines a working surface and has a cutting tool which is attached to and movable with respect to the work table. The position of the cutting tool with respect to the working surface is controlled by a mechanism which elevates the cutting tool with respect to the working surface and angulates the cutting tool with respect to the working surface. The cutting tool is mounted to a support plate which is pivotably attached to the work table. The elevating mechanism includes a threaded rod and a nut which engages a pivoting link. The pivoting link also engages the cutting tool. Rotation of the threaded rod pivots the link which in turn raises and lowers the cutting tool. A spring biases the cutting tool towards its lower position to remove play between the components. The angulating mechanism includes a lever, two cams and a locking rod. Rotation of the lever moves the locking rod longitudinally due to the action between the two cams. The longitudinal movement of the rod compresses the support plate between the work table and a bracket to maintain the position of the support plate with respect to the work table. Also included is an integral arbor wrench which is accessible when the throat plate is removed to lock the arbor to facilitate tool changing. The wrench is designed to not allow reassembling of the throat plate when the wrench is in engagement with the arbor shaft.

23 Claims, 8 Drawing Sheets

U.S. PATENT DOCUMENTS

| | | | |
|---|---|---|---|
| 1,762,023 A | 6/1930 | Longenecker | |
| 1,821,113 A | 9/1931 | Neighbour | |
| 1,922,151 A | 8/1933 | Boice et al. | |
| 1,988,102 A | 1/1935 | Woodward | |
| 1,993,219 A | 3/1935 | Merrigan | |
| 2,008,673 A | 7/1935 | Ocenasek | |
| 2,038,810 A | 4/1936 | Tautz | |
| 2,067,652 A | 1/1937 | Tautz | |
| 2,068,964 A | 1/1937 | Tautz | |
| 2,075,282 A | 3/1937 | Hedgpeth | |
| 2,097,920 A | 11/1937 | Hedgpeth | |
| 2,106,288 A | 1/1938 | Tautz | |
| 2,121,069 A | 6/1938 | Collins | |
| 2,131,492 A | 9/1938 | Ocenasek | |
| 2,168,282 A | 8/1939 | Tautz | |
| 2,208,582 A * | 7/1940 | Hollister | 83/471.3 |
| 2,261,696 A | 11/1941 | Ocenasek | |
| 2,265,407 A | 12/1941 | Tautz | |
| 2,292,872 A | 8/1942 | Eastman | |
| 2,299,262 A | 10/1942 | Uremovich | |
| 2,312,118 A | 2/1943 | Neisewander | |
| 2,518,684 A | 8/1950 | Harris | |
| 2,530,290 A | 11/1950 | Collins | |
| 2,590,035 A | 3/1952 | Pollak | |
| 2,601,878 A | 7/1952 | Anderson | |
| 2,625,966 A | 1/1953 | Copp | |
| 2,626,639 A | 1/1953 | Hess | |
| 2,661,777 A | 12/1953 | Hitchcock | |
| 2,678,071 A | 5/1954 | Odlum et al. | |
| 2,695,638 A | 11/1954 | Gaskell | |
| 2,704,560 A | 3/1955 | Woessner | |
| 2,711,762 A | 6/1955 | Gaskell | |
| 2,758,615 A | 8/1956 | Mastriforte | |
| 2,810,408 A | 10/1957 | Boice et al. | |
| 2,844,173 A | 7/1958 | Gaskell | |
| 2,850,054 A | 9/1958 | Eschenburg | |
| 2,852,047 A | 9/1958 | Odlum et al. | |
| 2,873,773 A | 2/1959 | Gaskell | |
| 2,894,546 A | 7/1959 | Eschenburg | |
| 2,945,516 A | 7/1960 | Edgemond, Jr. et al. | |
| 3,005,477 A | 10/1961 | Sherwen | |
| 3,011,529 A | 12/1961 | Copp | |
| 3,013,592 A | 12/1961 | Ambrosio et al. | |
| 3,021,881 A | 2/1962 | Edgemond, Jr. et al. | |
| 3,085,602 A | 4/1963 | Gaskell | |
| 3,169,698 A | 2/1965 | Lord et al. | |
| 3,315,715 A | 4/1967 | Mytinger | |
| 3,344,819 A | 10/1967 | Mitchell | |
| 3,356,111 A | 12/1967 | Mitchell | |
| 3,538,964 A | 11/1970 | Warrick et al. | |
| 3,581,784 A | 6/1971 | Warrick et al. | |
| 3,670,788 A | 6/1972 | Pollak et al. | |
| 4,249,442 A | 2/1981 | Fittery | |
| 4,270,427 A | 6/1981 | Colberg et al. | |
| 4,276,799 A | 7/1981 | Muehling | |
| 4,297,921 A | 11/1981 | Wydra | |
| 4,516,612 A | 5/1985 | Wiley | |
| 4,599,927 A | 7/1986 | Eccardt et al. | |
| 4,776,189 A | 10/1988 | Weber et al. | |
| 4,962,685 A | 10/1990 | Hagstrom | |
| 5,040,444 A | 8/1991 | Shiotani et al. | |
| 5,174,349 A | 12/1992 | Svetlik et al. | |
| 5,193,428 A | 3/1993 | Letendre | |
| 5,437,214 A | 8/1995 | Sasaki et al. | 83/471.3 |
| 6,453,786 B1 * | 9/2002 | Ceroll et al. | 83/473 |

* cited by examiner

BLADE AND MOTOR CARRIER WITH HEIGHT/ANGLE ADJUSTMENT MECHANISM

This is a division of U.S. patent application Ser. No. 09/416,425, filed Oct. 12, 1999, now U.S. Pat. No. 6,453,786, which is a division of U.S. patent application Ser. No. 09/179,815, filed Oct. 27, 1998 which is now U.S. Pat. No. 6,244,149, which is a division of U.S. patent application Ser. No. 08/663,538, filed Jun. 17, 1996 which is now U.S. Pat. No. 5,875,698.

FIELD OF THE INVENTION

The present invention relates to a saw blade height/angle adjustment mechanism. More particularly, the present invention relates to a motor carrier for a table saw which provides a unique height/angle adjustment mechanism for a saw blade attached to the powered shaft of the motor.

BACKGROUND OF THE INVENTION

A typical table saw includes a base which supports a generally flat table top having a longitudinally extending slot and a pair of side rails extending along opposite sides of the table top generally perpendicular to the slot. The side rails are utilized for mounting a rip fence assembly to assist in positioning an article to be cut in relation to a cutting tool. A motor is mounted beneath the table top and the cutting tool, which may be a circular saw blade, is mounted for rotation with the powered output shaft of the motor. When the cutting tool is mounted directly to the shaft of the motor, or if the cutting tool is mounted to a transmission powered by the motor, the mounting of the motor and/or transmission is provided with adjustments which selectively position the cutting tool to extend through the slot in the table top. One adjustment for the motor and/or transmission determines the amount of the cutting tool which extends through the slot to control the depth of cutting. Another adjustment for the motor and/or transmission determines the angle of the cutting tool with respect to the table top to control the bevel angle or the angle of cutting. The cutting tool is thus positioned to project upwardly through the slot and is rotated by the motor with both the height of the cutting tool with respect to the table top and the angle of the cutting tool with respect to the table top being determined by the mounting mechanism for the motor and/or transmission. Cutting of the workpiece is normally accomplished by moving the workpiece longitudinally through the rotating cutting tool.

Machine tools are used for cross cutting (transverse cutting to the length of the workpiece), miter cutting (at an angle to the length of the workpiece) and rip cutting (longitudinal cutting along the length of the workpiece). For cross cutting and miter cutting, an angularly and laterally adjustable fixture or fence is used which positions the workpiece perpendicular to or at the desired angle relative to the cutting tool. For rip cutting, a separate rip fence assembly is mounted on the side rails and positioned at a pre-selected distance from the cutting tool in order to perform the longitudinal or rip cutting operation on the workpiece.

When performing a cross cutting operation, a miter cutting operation or a rip cutting operation, it is advantageous to have the ability to control the depth of cut. This is accomplished by moving the saw blade generally perpendicular to the table top to change the amount of the cutting tool which extends through the table top. In addition, certain application will require the addition of a bevel angle during the particular cutting operation whether it be cross cutting, miter cutting or rip cutting. The introduction of a bevel angle is accomplished by angulating the cutting tool with respect to the table top or angulating the table top with respect to the cutting tool.

Manufacturers of power tool equipment have developed a variety of mechanisms which provide for both the height adjustment and the angular adjustment of the cutting tool with respect to the table top when the power tool is a direct drive power tool. The continued development of the height and angle adjustment mechanisms is directed towards systems which rigidly hold the cutting tool at the pre-selected position while maintaining a simple and easily actuated system for moving the cutting tool to other desired positions. The system should be as rigid as possible to provide accuracy during the cutting operation but should maintain an easily actuated mechanism to facilitate the changes required by the user. The system should provide the above advantages while keeping both the weight of the system and the costs to manufacture the system at a minimum.

SUMMARY OF THE INVENTION

The present invention provides the art with a height and angle adjustment mechanism for a cutting tool. The mechanism includes a motor and arbor support plate which is pivotably secured to the bottom of the work surface of the cutting tool by a pair of brackets to provide for the angular adjustment. A transmission or gear case is slidably connected to the support plate to provide for the height adjustment. The motor, arbor and cutting tool are attached to the gear case. The cutting tool height is adjusted by way of a crank and a threaded rod, upon which a rod follower is movably threaded. The rod follower is connected to a height adjusting lever for slidably moving the gear case and thus the motor, arbor and cutting tool upwardly and downwardly depending upon the direction in which the crank is rotated. The cutting tool angular position is adjusted by pivotably moving the support plate to change the angle of the blade. The angular position of the support plate is locked in position by a locking bar which extends through an arcuate slot in the front of the cutting tool base across the support plate and through a similar arcuate slot in a bracket attached to the rear of the cutting tool base. A cam lever mechanism is positioned outward of the front of the cutting tool base such that when the cam lever is pivoted to its locked position, the locking bar is pulled forwardly compressing and frictionally locking the support plate between the bracket and the front of the cutting tool base. The flexibility of the locking rod and the bracket provides the ability for the compressing of the support plate. The locking of the support plate to both the front and rear of the base provides increased rigidity to the system once it is locked.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENTS

Figure 1:
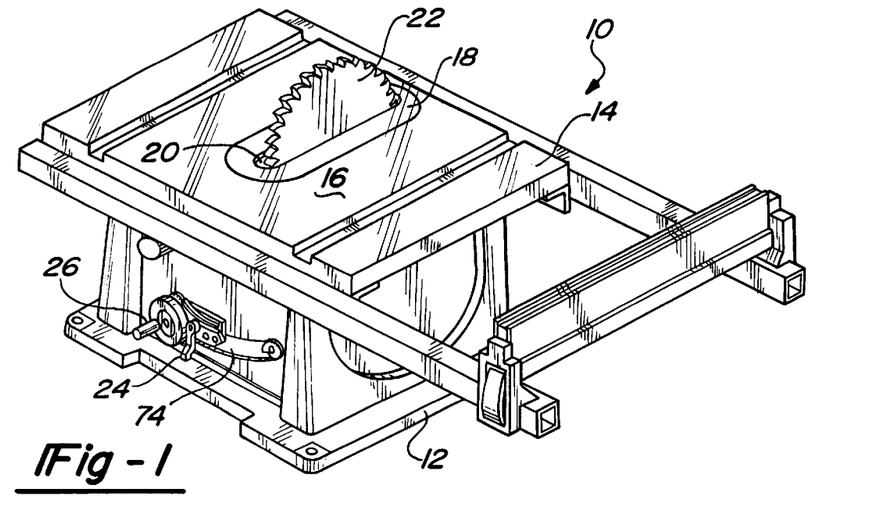
FIG. 1 is a perspective view of a table saw incorporating a unique height and angular adjustment mechanism in accordance with the present invention.

Referring now to the drawings in which like reference numerals designate like or corresponding parts throughout the several views, there is shown in FIG. 1 a machine tool which is designated generally by the reference numeral 10 incorporating a height/angle adjustment mechanism for the cutting tool and motor carrier in accordance with the present invention. While the height/angle adjustment mechanism of the present invention is being illustrated for exemplary purposes as being used in conjunction with machine tool 10 in the form of a table saw, it is within the scope of the present invention to incorporate the height/angle adjustment mechanism of the present invention into any type of machine tool which utilizes a cutting tool.

Referring to FIG. 1, machine tool 10 comprises a base 12 which supports a generally rectangular work table 14 defining a working surface 16. Work table 14 includes a throat plate 18 which includes an elongated slot 20 through which a circular saw blade 22 protrudes. Saw blade 22 is capable to being adjusted for angularity with respect to working surface 16 by an angle or bevel adjustment mechanism 24 as well as being capable of being adjusted for depth of cut by a height adjustment mechanism 26. Machine tool 10 is illustrated as a portable table saw which is easily movable from one job site to another. Table saw 10 can easily be picked up and carried utilizing work table 14 as the supporting locations when it becomes necessary to lift and carry table saw 10 from one job site to another.

Figure 2:
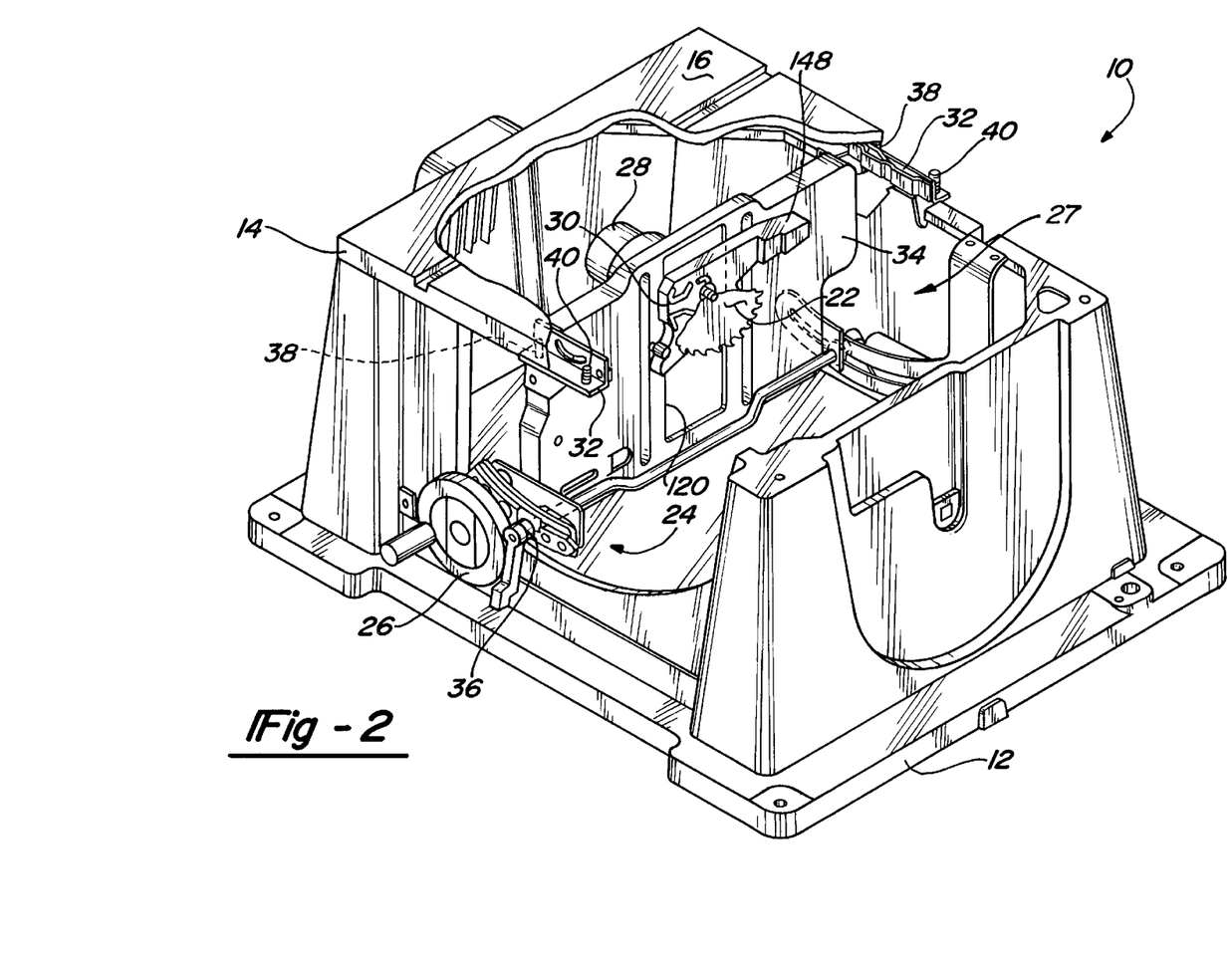
FIG. 2 is a cut-away perspective view of the table saw shown in FIG. 1 with a portion of the upper surface of the work table removed and the base cut away to illustrate the adjustment mechanisms in accordance with the present invention.

Referring now to FIG. 2, table saw 10 is illustrated with working surface 16 of work table 14 partially removed and a portion of base 12 cut away. Circular saw blade 22 is rotated by a motor 28 which powers saw blade 22 through a gear case 30. Bevel adjustment mechanism 24 adjusts the angular position of saw blade 22 by pivoting saw blade 22, motor 28 and gear case 30. Height adjustment mechanism 26 adjusts the cutting depth of saw blade 22 by vertical movement of saw blade 22, motor 28 and gear case 30.

Figure 3:
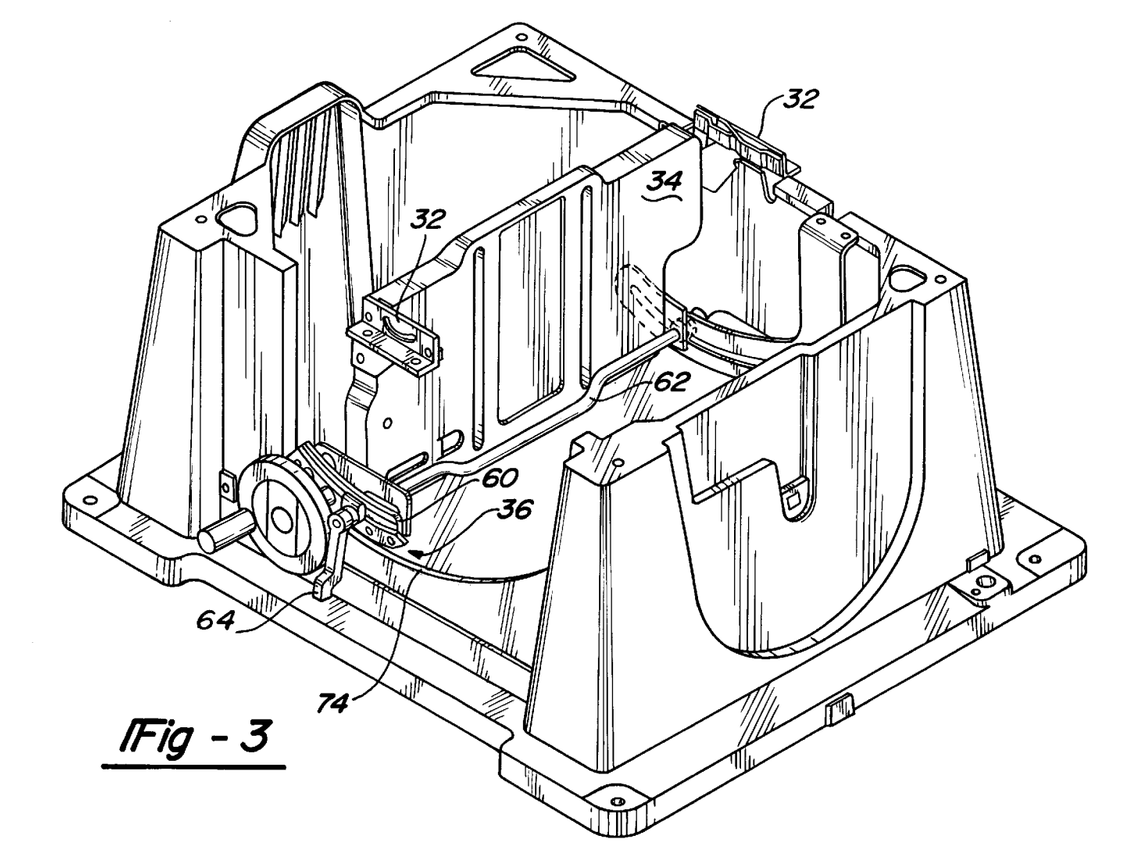
FIG. 3 is a cut-away perspective view similar to FIG. 2 with the motor, saw blade and gear case removed to illustrate the angular adjustment mechanism in accordance with the present invention.
Figure 7:
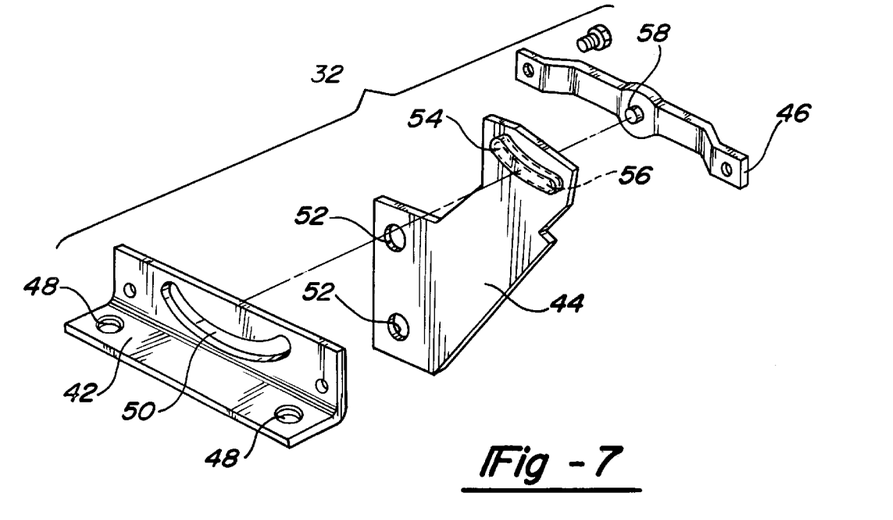
FIG. 7 is an exploded perspective view of the pivot quadrants incorporated into the angular adjustment mechanism of the present invention.

Referring now to FIGS. 2 and 3, bevel adjustment mechanism 24 comprises a pair of pivot quadrants 32, a support plate 34, and a locking system 36. Each pivot quadrant 32 is attached to a plurality of bosses 38 extending from the bottom of work table 14 using a plurality of bolts 40. Each pivot quadrant 32 is designed to pivot around a center which is located on working surface 16 of work table 14 coincident with the plane of saw blade 22. Thus, the axis for pivoting support plate 34 lies on working surface 16 and extends through the plane of saw blade 22 when saw blade 22 is generally perpendicular with working surface 16. As shown in FIG. 7, pivot quadrant 32 is comprised of a support bracket 42, a pivot bracket 44 and a retaining strap 46. Support bracket 42 is an L-shaped bracket which defines a plurality of holes 48 to facilitate the attachment of pivot quadrant 32 to work table 14 on one leg of the L. The opposite leg of the L defines an arcuate slot 50 which controls the pivotal movement of pivot bracket 44 and locates the center of the pivoting at working surface 16 of work table 14. Pivot bracket 44 extends between support bracket 42 and support plate 34 and defines a plurality of holes 52 at one end to facilitate the attachment of support plate 34. The opposite end of pivot bracket 44 defines a stamped arcuate protrusion 54 which mates with slot 50 to control the pivoting of pivot bracket 44. Protrusion 54 is formed out of the material of pivot bracket 44 and this forming operation defines an arcuate slot 56 once protrusion 54 has been formed. Retaining strap 46 extends across pivot bracket 44 and is attached to support bracket 42 to maintain the engagement of protrusion 54 with slot 50. Retaining strap 46 defines a formed protrusion 58 which extends into slot 56 to both guide the pivotal movement of pivot bracket 44 and to act as a stop to limit the pivotal movement of pivot bracket 44.

Figure 4:
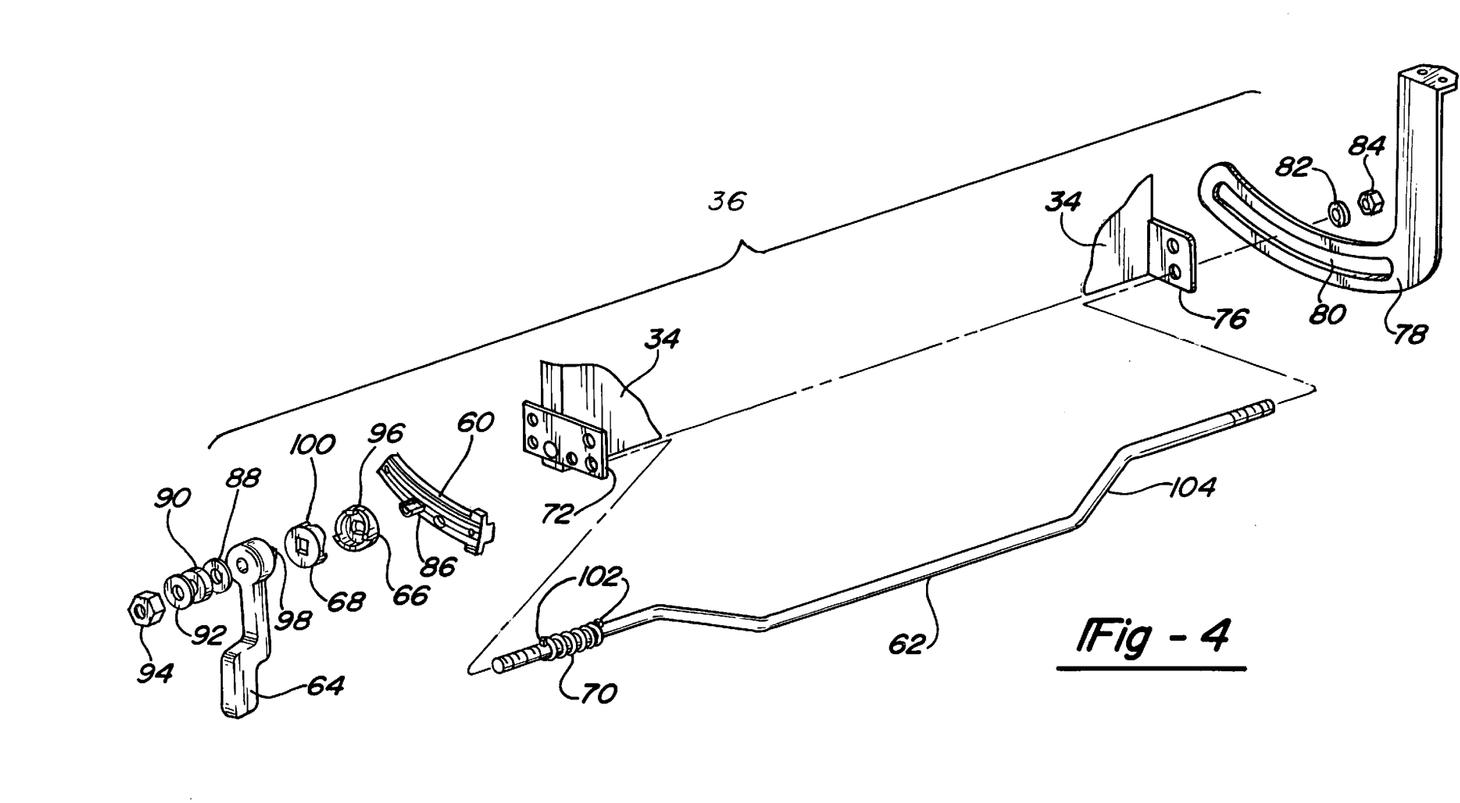
FIG. 4 is an exploded perspective view of the angular adjustment mechanism shown in FIG. 3.

Referring now to FIGS. 3 and 4, support plate 34 is a shallow drawn plate which is attached to pivot quadrants 32. Support plate 34 is designed to support both height adjustment mechanism 26 and locking system 36. Locking system 36 comprises a bearing block 60, a locking rod 62, a locking arm 64, a bearing block cam 66, a locking arm cam 68 and a return spring 70. Bearing block 60 is a curved member which is attached to a bracket 72 which is in turn attached to support plate 34. Bearing block 60 thus pivots with support plate 34 and bearing block 60 extends through an arcuate slot 74 in the front face of base 12. While the pivotal movement of support plate 34 moves bearing block 60 within slot 74, it should be understood that the movement of support plate 34 is controlled by pivot quadrants 32 and that a clearance will always exist between bearing block 60 and slot 74.

Locking rod 62 extends across support plate 34 and through bracket 72 and bearing block 60 in the front of support plate 34 and through a bracket 76 and a bracket 78 located at the rear of support plate 34. Bracket 76 is attached to support plate 34 and defines an aperture for accepting and guiding locking rod 62. Bracket 78 is attached to work table 14 and it defines an arcuate slot 80 which accepts locking rod 62 and allows for the pivotal movement of support plate 34. While the pivotal movement of support plate 34 moves locking rod 62 within slot 80, it should be understood that the movement of support plate 34 is controlled by pivot quadrants 32 and that a clearance will always exist between locking rod 62 and slot 80. Once locking rod 62 has been inserted through brackets 76 and 78, an adjustment device in the form of a washer 82 and a nut 84 is assembled to locking rod 62 to provide adjustment for locking system 36. The front end of locking rod 62 extends through bearing block 60 and through a D-shaped embossment 86 which is an integral part of bearing block 60. Locking arm 64 is assembled over the end of locking rod 62 and secured to locking rod 62 using a hardened washer 88, a thrust bearing 90, a hardened washer 92 and a nut 94 threadingly received on locking rod 62 as shown in FIG. 4.

Bearing block cam 66 and locking arm cam 68 are disposed between locking arm 64 and bearing block 60. D-shaped embossment 86 extends from bearing block 60 through slot 74 in the front face of base 12. Bearing block cam 66 includes a D-shaped aperture which mates with embossment 86 and cam 66 is positioned such that the front panel of base 12 is sandwiched between bearing block 60 and bearing block cam 66. The engagement of the D-shaped aperture of cam 66 with D-shaped embossment 86 prohibits the rotational movement of cam 66 with respect to bearing block 60. The face of cam 66 opposite to the front surface of base 12 defines a camming surface 96 which reacts with locking arm cam 68 to activate locking system 36.

Locking arm 64 defines a D-shaped embossment 98 which mates with a D-shaped aperture extending through locking arm cam 68 such that locking arm cam 68 pivots with locking arm 64 when locking arm 64 pivots on locking rod 62. The face of cam 68 opposite to locking arm 64 defines a camming surface 100 which mates with camming surface 96 on cam 66 such that pivoting motion of locking arm 64 with respect to locking rod 62 will cause longitudinal movement of locking rod 62 to activate locking system 36. Return spring 70 is disposed on locking rod 62 between an ear 102 formed on locking rod 62 and bearing block 60 in order to urge locking rod 62 towards the rear of base 12 or towards bracket 78. Locking rod 62 is shown with an additional ear 102 on the opposite side of return spring 70 to capture spring 70 in the unassembled condition of locking rod 62. The additional ear 102 requires that the aperture in bearing block 60 which accepts locking rod 62 be provided with a slot (not shown) to accept the additional ear 102. In this arrangement, the engagement of the additional ear 102 with the slot in bearing block 60 will prohibit any rotational movement of locking rod 62.

When camming surface 96 is aligned with camming surface 100, pivoting of support plate 34 and thus saw blade 22 and motor 28 is permitted. The biasing of locking rod 62 towards the rear of base 12 causes embossment 98 to bottom against embossment 86. In this condition, there is a clearance created between camming surface 96 and camming surface 100 as well as a clearance created between bracket 76 and bracket 78. These clearances allow for a smooth pivoting of support plate 34 and thus a smooth angular adjustment for saw blade 22. The pivoting of support plate 34 is controlled by pivot quadrants 32 while bearing block 60 moves within slot 74 in the front panel of base 12 and locking rod 62 moves within slot 80 in bracket 78. When the desired angle of saw blade 22 is obtained, locking system 36 is activated by pivoting locking arm 64 on locking rod 62 which rotates cam 68 with respect to cam 66. Camming surface 100 is cammed away from camming surface 96 causing longitudinal movement of locking rod 62. The longitudinal movement of locking rod 62 compresses support plate 34 between bracket 78 and the front face of base 12 due to washer 82 and nut 84 engaging bracket 78 and bearing block cam 66 engaging the front surface of base 12. The flexibility of locking rod 62 due to a center off-set area 104 and the flexibility of bracket 78 permit the compression of support plate 34. The adjustment for locking system 36 is provided for by nut 84.

Referring now to FIGS. 2, 5, 6 and 9, height adjustment mechanism 26 comprises a pivot link 110, a biasing spring 112, a follower nut 114, a height adjustment screw 116 and a crank handle 118 which function to move saw blade 22, motor 28 and gear case 30 longitudinally with respect to support plate 34.

Figure 9:
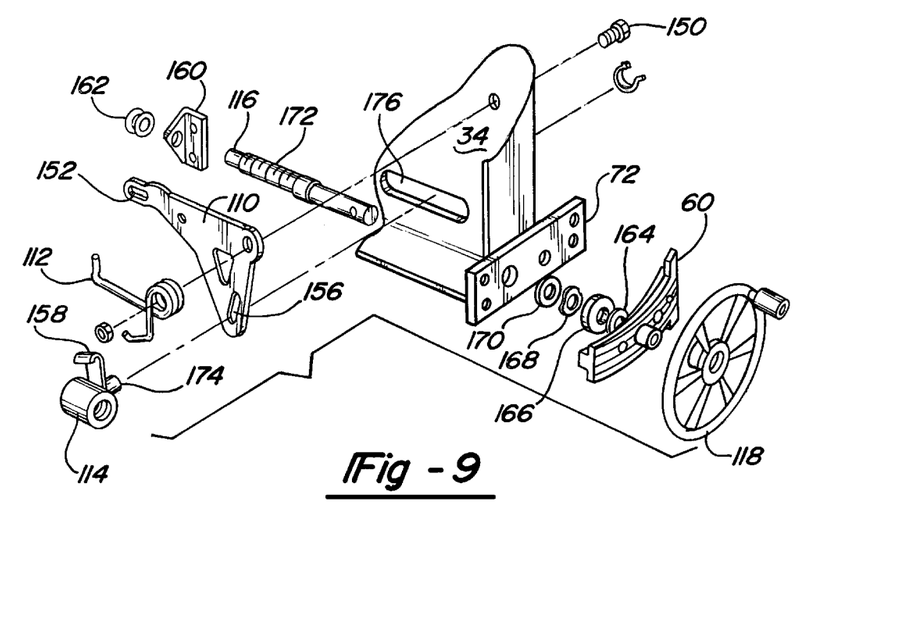
FIG. 9 is an exploded perspective view of the height adjustment mechanism shown in FIGS. 5–6.

Support plate 34 defines a generally rectangular opening 120 within which gear case 30 is located. Located adjacent to and extending generally the entire length of opening 120 are a pair of formed ribs 122 which provide stiffness to support plate 34. Gear case 30 includes a housing 124 disposed on one side of support plate 34 and a cover 126 disposed on the opposite side of support plate 34. Cover 126 is secured to housing 124 by a plurality of bolts 128 such that support plate 34 is sandwiched between cover 126 and housing 124. Gear case 30 includes a pair of longitudinally extending surfaces 130 which engage the opposing sides of opening 120 to guide the movement of gear case 30 within opening 120. Motor 28 is attached to housing 124 and includes an armature shaft 132 having a pinion 134 which meshes with an output gear 136 which is rotatably supported within gear case 30. The output gear includes an arbor shaft 138 which provides for the attachment of saw blade 22. Thus, when motor 28 is powered, armature shaft 132 and pinion 134 rotate which rotates output gear 136 and arbor shaft 138 which in turn rotates saw blade 22.

Figure 5:
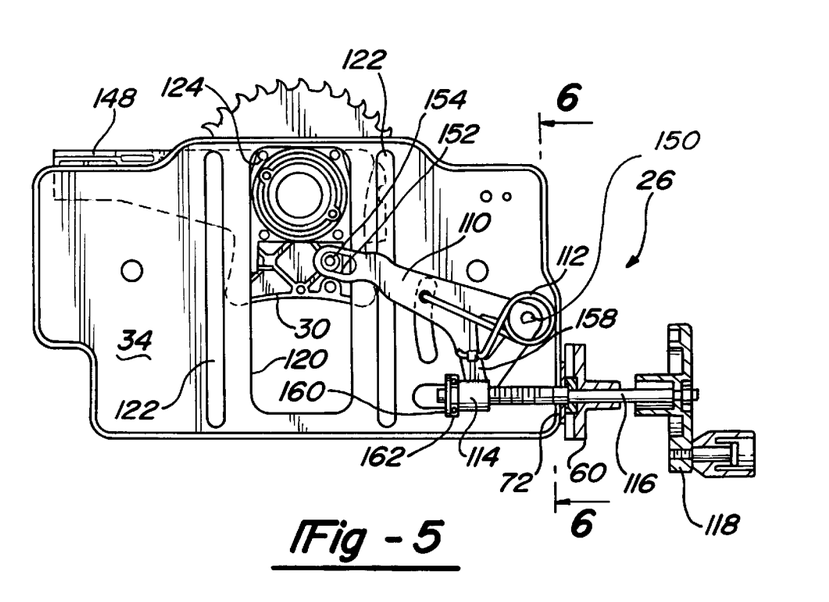
FIG. 5 is a side view of the support plate shown in FIGS. 1–3 with the motor, saw blade and mounting plate included to illustrate the height adjustment mechanism in accordance with the present invention.
Figure 6:
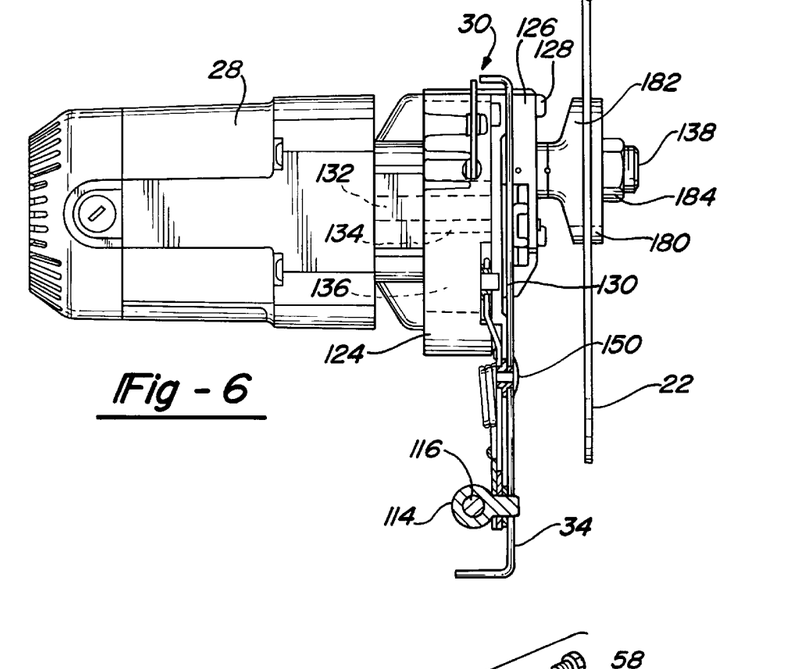
FIG. 6 is an end view of the height adjustment mechanism shown in FIG. 5.
Figure 8:
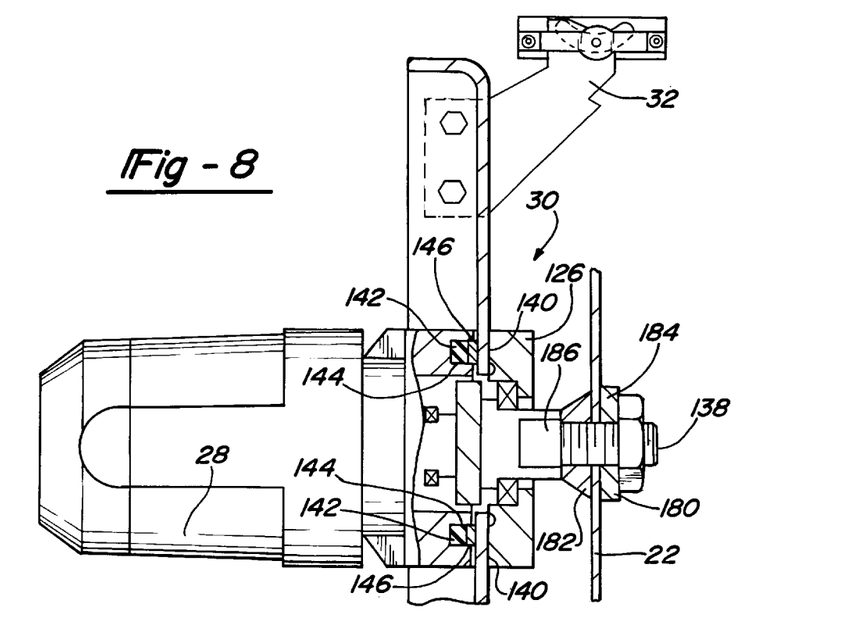
FIG. 8 is a schematic cross-sectional view taken through the gear case illustrating the assembly of the gear case to the support plate.

Referring now to FIG. 8, the accurate positioning of saw blade 22 is required in order to provide accurate cuts. In order to accurately position saw blade 22, the front face, or the face adjacent saw blade 22, of support plate 34 is defined as a datum face. Cover 126 is provided with a plurality of accurately machined pads 140 which accurately position cover 126 and thus saw blade 22 with respect to support plate 34. Machined pads 140 are biased against the datum face on support plate 34 by a plurality of elastomeric springs 142 each of which is disposed within an aperture 144 defined by housing 124. A low friction wear pad 146 is disposed between each elastomeric spring 142 and support plate 34 to facilitate the movement of gear case 30 within opening 120. Thus, gear case 30, motor 28 and saw blade 22 move longitudinally within opening 120 guided by surfaces 130 with gear case 30 being biased against the datum face of support plate 34 by elastomeric springs 142. As shown in FIGS. 2 and 5, cover 126 includes an extension 148 which can be utilized for supporting a splitter and/or guard mechanism for table saw 10 if desired. The mounting of the splitter and/or guard mechanism on cover 126 allows the components to travel with saw blade 22 during cutting depth and/or angular adjustments.

Referring back to FIGS. 2, 5, 6 and 9, pivot link 110 is pivotably secured to support plate 34 by an appropriate fastener 150. One arm of pivot link 110 defines a slot 152 which engages a pin 154 attached to gear case 30. The second arm of pivot link 110 defines a slot 156 which engages follower nut 114. Biasing spring 112 is a tension spring positioned around fastener 150 and is disposed between pivot link 110 and a retainer 158. Retainer 158 is attached to follower nut 114 and biasing spring 112 is positioned such that its spring force biases gear case 30 towards a downward position. By biasing pivot link 110 in this direction, the play between the various components of height adjustment mechanism 26 can be eliminated. In addition, the biasing load provided by biasing spring 112 is resisted by follower nut 114 and not by adjustment screw 116 as in many prior art table saws.

Height adjustment screw 116 is rotatably secured at one end by a bracket 160 which is a separate component or bracket 160 can be formed out of support plate 34. A nylon bushing 162 is disposed between screw 116 and bracket 160 to facilitate the rotation of screw 116 and provide a smoothness of operation. The loading and thus the wear between screw 116, bushing 162 and bracket 160 is significantly reduced due to the reaction of spring 12 occurring through follower nut 114 and not through screw 116. The opposite end of adjustment screw 116 extends through and is rotatably supported by bearing block 60. The portion of adjustment screw 116 which extends beyond bearing block 60 is adapted for securing crank handle 118 to adjustment screw 116 such that rotation of crank handle 118 causes rotation of adjustment screw 116. Disposed between bearing block 60 and bracket 72 of support plate 34 is a hardened washer 164, a powdered metal washer 166, a spring thrust washer 168 and a hardened washer 170. Powdered metal washer 166 is secured to adjustment screw 116 by press fitting or other means known in the art. The biasing of spring thrust washer 168 produces frictional resistance to the rotation of adjustment screw 116 allowing for the accurate positioning of saw blade 22 and the ability of height adjustment mechanism 26 to maintain the position of saw blade 22 during the cutting operation. The frictional resistance or drag produced by spring thrust washer 168 maintains the position of adjustment screw 116 and is not affected by the vibration produced by motor 28 and/or the cuffing operation. In addition, the biasing produced by spring thrust washer 168 removes any play which may exist between the various components of height adjustment 26.

Follower nut 114 is threadingly received on a threaded portion 172 of screw 116 which is located between bracket 160 and bearing block 60. Follower nut 114 includes a cylindrical finger 174 which extends into retainer 158, into slot 1546 of pivot link 110 and into a slot 176 located in support plate 34 to cause the pivoting of pivot link 110 by follower nut 114. Slot 176 in support plate 34 prohibits rotation of follower nut 114 and tends to guide follower nut 114 as it moves along screw 116. In addition, the contact between finger 174 and the edge of slot 176 provides the reaction point for spring 112. Thus, when crank handle 118 is rotated, adjustment screw 116 is rotated which causes follower nut 114 to move longitudinally along threaded portion 172 of adjustment screw 116. The direction of movement of follower nut 14 will be determined by the design of threaded portion 172 and the direction of rotation of crank handle 118. The longitudinal movement of follower nut 114 causes pivotal movement of pivot link 110 due to the engagement of finger 174 which engages slot 176. The pivotal movement of pivot link 110 causes the longitudinal movement of gear case 30, motor 28 and saw blade 22 due to the engagement of slot 152 with pin 154. The longitudinal movement of gear case 30, motor 28 and saw blade 22 sets the height of saw blade 22 extending through work table 14 and thus the depth of cut.

Figure 10:
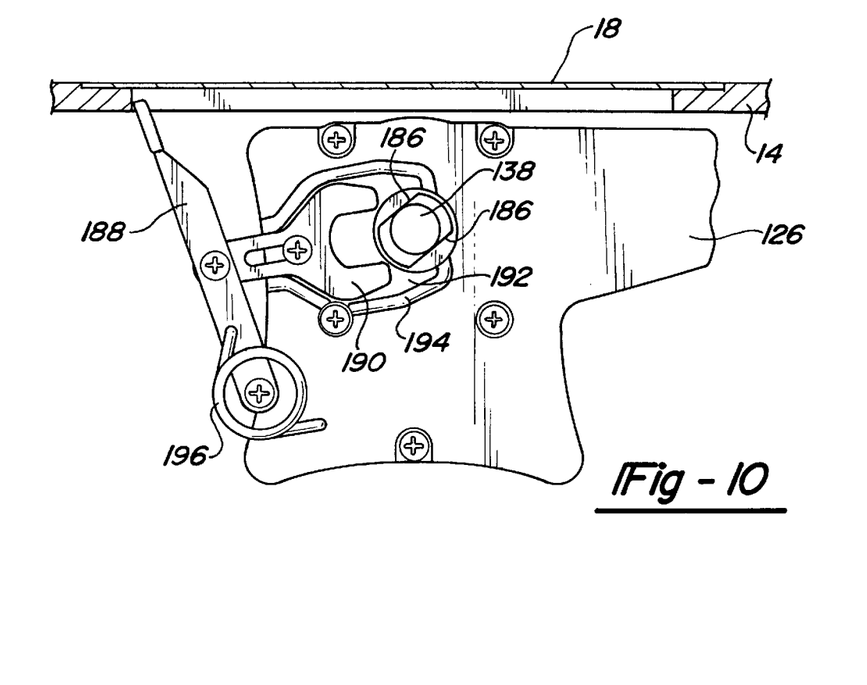
FIG. 10 is a side view illustrating the arbor locking mechanism in accordance with the present invention in the unlocked position.
Figure 11:
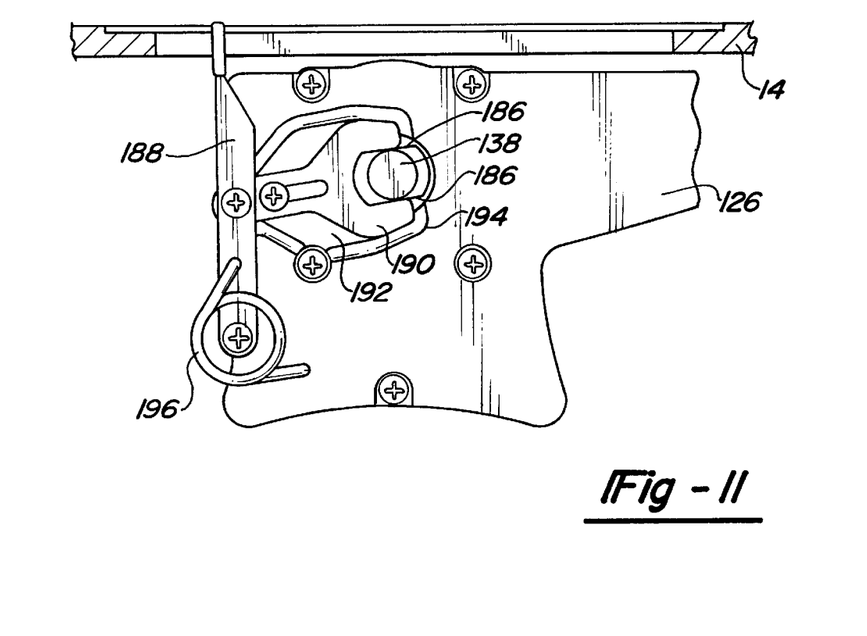
FIG. 11 is a side view similar to FIG. 10 but showing the locking mechanism in the locked position.

Referring to FIGS. 8, 10 and 11, cover 126 of gear case 30 supports another unique feature for machine tool 10. One of the problems associated with machine tools is the changing of the cutting tool. Saw blade 22 is assembled to arbor shaft 138 and is frictionally held in position by a pair of washers 180, 182 and an arbor nut 184. Arbor shaft 138 includes a pair of flats 186 which accept a wrench 190 in order to stop arbor shaft 138 from rotating when arbor nut 184 is to be loosened or tightened during the changing of saw blade 22. The wrench for engaging flats 186 is normally a separate piece which is easily misplaced which then leads to the wedging of a block of wood or other material against saw blade 22 to hold arbor shaft 138. The wedging of the block against saw blade 22 is both dangerous and leads to unnecessary loading of the bearings supporting arbor shaft 138. The present invention includes a lever 188 which is pivotably secured to cover 126. Wrench 190 is pivotably secured to lever 188 and moves within a pocket 192 formed by a ridge 194 which is an integral part of cover 126 between an unlocked position shown in FIG. 10 and a locked position shown in FIG. 11. A spring 196 biases wrench 190 into its unlocked position.

The unlocked position of wrench 190 is shown in FIG. 10 where wrench 190 is disconnected from flats 186 and arbor shaft 138 is free to rotate. The locked position is shown in FIG. 11 where wrench 190 engages flats 186 to prohibit rotation of arbor shaft 138. The end of wrench 190 engages ridge 194 at both the front of wrench 190 adjacent arbor shaft 138 to provide support for wrench 190 in the locked position and at the rear of wrench 190 adjacent to lever 188 to provide support to counteract the torque being allied to arbor nut 184. Lever 188 is accessible to the operator of table saw 10 through the opening in work table 14 which accepts throat plate 18. Lever 188 is designed to extend into the throat plate opening of work table 14 when wrench 190 is in the locked position and saw blade 22 is in its full upward position as shown in FIG. 11 to prohibit the assembly of throat plate 18 with work table 14 while wrench 190 is in the locked position. Once wrench 190 is moved to its unlocked position, lever 188 will be removed from the throat plate opening in work table 14 and throat plate 18 can be assembled to work table 14.

Figure 12:
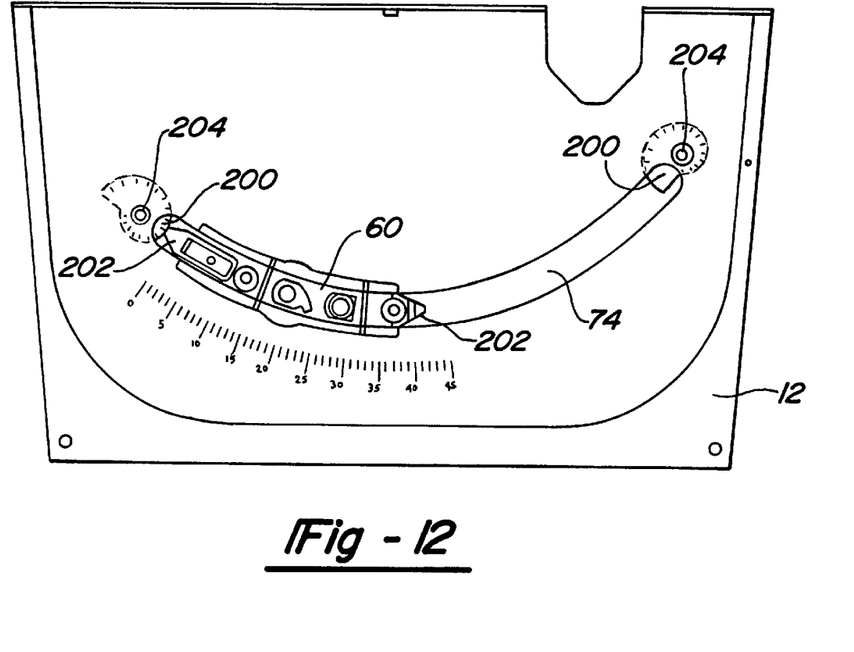
FIG. 12 is a side view schematically illustrating an adjustment mechanism for the bevel adjustment system of the present invention.

FIG. 12 illustrates a bevel angle stop system for bevel adjustment mechanism 24. An adjustment cam 200 is attached to the front panel of work table 14 at opposite ends of slot 74. A protrusion 202 is formed at both ends of bearing block 60. When saw blade 22 is positioned at a point perpendicular to working surface 16, adjustment cam 200 at the zero degree position is rotated until it contacts the zero degree protrusion 202 on bearing block 60. Adjustment cam 200 is tightened in position using a bolt 204 to set the zero degree position of saw blade 22. The tightening of bolt 204 has a tendency to rotate cam 200 in a clockwise direction. The rotation of cam 200 in a clockwise direction urges cam 200 into contact with protrusion 202 due to the external spiral shape of cam 200 to provide an accurate positioning of the bevel angle for saw blade 22. The perpendicularity of saw blade 22 can be set by a square or other means known well in the art. In a similar manner, the 45° position of saw blade 22 with respect to working surface 16 can be set by a similar adjustment and locking of adjustment cam 200 located on the opposite side of slot 74.

While the above detailed description describes the preferred embodiment of the present invention, it should be understood that the present invention is susceptible to modification, variation and alteration without deviating from the scope and fair meaning of the subjoined claims.

What is claimed is:

1. A saw comprising:
   a work table for supporting a workpiece, the work table having a substantially horizontal surface defining a slot;
   a base supporting the work table, the base and the work table defining an internal cavity;
   a support plate disposed below the work table within the internal cavity, the support plate being pivotally attached to the work table and being disposed along a plate plane intersecting the horizontal surface, the support plate being pivotable between a first position and a second position;

a motor supported by the support plate;

a cutting tool rotatably supported by the support plate and driven by the motor, the cutting tool extending from the internal cavity through the slot in the work table and being disposed along a tool plane substantially parallel to the plate plane of the support plate, the cutting tool forming a first angle with respect to the horizontal surface when the support plate is in the first position, the cutting tool forming a second angle with respect to the horizontal surface when the support plate is in the second position, the second angle being different than the first angle;

a bearing block connected to the support plate; and a first bevel stop cam rotatably supported by the base, the first bevel cam stop defining a spiral surface;

wherein the first position of the support plate is defined by contact between the spiral surface of the first bevel stop cam and the bearing block.

2. The saw of claim 1, further comprising a second bevel stop cam rotatably attached to the base.

3. The saw of claim 1, wherein the second bevel stop cam is rotatable about an axis substantially parallel to the plate plane and the horizontal surface.

4. The saw of claim 3, wherein the second limit of the motion range is defined by contact between the second bevel stop cam and the bearing block.

5. The saw of claim 2, wherein the base has a front panel, and the first and second bevel stop cams are rotatably attached to the front panel.

6. The saw of claim 1, wherein the bearing block extends generally perpendicular to the plate plane of the support plate.

7. The saw of claim 1, wherein the first bevel stop cam is rotatable about an axis substantially parallel to the plate plane.

8. The saw of claim 7, wherein the axis of rotation of the first bevel cam is substantially parallel to the horizontal surface.

9. The saw of claim 1, further comprising:

a cutting tool angulating mechanism mounted to said support plate, said angulating mechanism being operable to pivot said support plate with respect to said work table such that said cutting tool angulates with respect to said horizontal surface; and a bracket attached to said work table and positioned adjacent to a rear side of said support plate, wherein said cutting tool angulating mechanism includes:

a locking rod attached to said support plate and extending through said work table and between a front side and said rear side of said support plate, said locking rod extending through said bracket and including an adjustment device disposed adjacent said bracket;

a locking arm attached to said locking rod and movable between a first position and a second position;

a bearing block cam attached to said support plate; and a locking arm cam attached to said support plate, said locking arm cam being in sliding contact with said bearing block cam and cooperating with said bearing block cam to compress said support plate between said locking arm and said adjustment device and to frictionally engage said support plate with said bracket when said locking arm is in said second position to lock said support plate and said cutting tool in a desired angular position.

10. The cutting machine according to claim 9, wherein the cutting tool angulating mechanism further comprises a biasing member disposed between said support plate and said locking arm, said biasing member urging said locking arm in a direction to create a clearance between said bracket and said adjustment device.

11. The cutting machine tool according to claim 1, wherein said support plate pivots about an axis which is located on the horizontal surface defined by said work table.

12. The cutting machine tool according to claim 1, further comprising at least one pivot quadrant pivotably securing said support plate to said work table.

13. The cutting machine according to claim 11, wherein said pivot quadrant comprises:

a support bracket attached to said work table;

a pivot bracket pivotably attached to said support bracket and fixably attached to said support plate; and a retaining strap attached to said support bracket, said retaining strap engaging said pivot bracket to maintain attachment of said pivot bracket to said support bracket.

14. The saw of claim 1, wherein said cutting tool is movably mounted to said support plate to move between a first position where said cutting tool extends through the slot in said work table and above said horizontal surface and a second position where said cutting tool is positioned below said horizontal surface and wherein said saw further comprises:

a cutting tool elevating mechanism attached to said support plate and in engagement with said cutting tool, said elevating mechanism being operable to move said cutting tool between said first and said second positions.

15. The cutting machine tool according to claim 14, wherein said elevating mechanism comprises:

an adjustment screw rotatably secured to said support plate;

an adjustment nut threadably engaging said adjustment screw such that rotation of said adjustment screw operates to move said adjustment nut longitudinally along said adjustment screw; and a pivot link pivotably secured to said support plate, said pivot link extending between and connected to each of said adjustment nut and said cutting tool such that rotation of said adjustment screw operates to pivot said pivot link to move said cutting tool between said first and said second positions.

16. The cutting machine according to claim 15, further comprising means for resisting rotation of said adjustment screw.

17. The cutting machine tool according to claim 16, wherein said means for resisting rotation comprises a washer attached to said adjustment screw, and a biasing means for urging said washer against said support plate to provide frictional resistance to rotation of said adjustment screw.

18. The cutting machine according to claim 14, further comprising biasing means for urging said cutting tool into one of said first and second positions.

19. The cutting machine according to claim 1, wherein said cutting tool is part of a cutting assembly, and the cutting assembly comprises:

a gear case mounted to said support plate, said motor being attached to one end of said gear case;

an arbor shaft rotatably secured to a second end of said gear case; and the cutting tool attached to said arbor shaft.

20. The cutting machine according to claim 19, further comprising means for biasing said gear case against a face of said support plate.

21. The cutting machine according to claim 19, further comprising:

a lever pivotably attached to said gear case and movable between a first position and a second position; and a wrench pivotably attached to said lever, said wrench engaging said arbor shaft to prevent its rotation with respect to said gear case when said lever is in said first position, said arbor shaft being free to rotate when said lever is in said second position.

22. The cutting machine according to claim 21, wherein said work table includes a throat plate disposed within a throat plate cavity defined by said work table and extending through said horizontal surface, said throat plate defining the slot in said work table, said lever extending into said throat plate cavity when said lever is in said first position so that said throat plate is prevented from being properly disposed within said throat plate cavity when said lever is in said first position.

23. The cutting machine according to claim 1, further comprising means to bias said cutting tool towards a face of said support plate.

\* \* \* \* \*

UNITED STATES PATENT AND TRADEMARK OFFICE
CERTIFICATE OF CORRECTION

PATENT NO. : 6595,096 B2
DATED : July 22, 2003
INVENTOR(S) : Warren A. Ceroll et al.

It is certified that error appears in the above-identified patent and that said Letters Patent is hereby corrected as shown below:

Column 9,
Line 21, "1" should be -- 2 --.

Signed and Sealed this

Eleventh Day of November, 2003

JAMES E. ROGAN
*Director of the United States Patent and Trademark Office*